W. J. DICKINSON.
SPRING MOTOR.
APPLICATION FILED JUNE 1, 1920.

1,362,480.

Patented Dec. 14, 1920.
4 SHEETS—SHEET 1.

W. J. DICKINSON.
SPRING MOTOR.
APPLICATION FILED JUNE 1, 1920.

1,362,480.

Patented Dec. 14, 1920.
4 SHEETS—SHEET 2.

Inventor
William John Dickinson
By
Atty.

W. J. DICKINSON.
SPRING MOTOR.
APPLICATION FILED JUNE 1, 1920.

1,362,480.

Patented Dec. 14, 1920.
4 SHEETS—SHEET 3.

Inventor
William John Dickinson
By
Atty.

UNITED STATES PATENT OFFICE.

WILLIAM JOHN DICKINSON, OF BURHAM, NEAR ROCHESTER, ENGLAND.

SPRING-MOTOR.

1,362,480. Specification of Letters Patent. Patented Dec. 14, 1920.

Application filed June 1, 1920. Serial No. 385,741.

*To all whom it may concern:*

Be it known that I, WILLIAM JOHN DICKINSON, a subject of the King of Great Britain, residing at Engineer's House, The British Portland Cement Manufacturers Limited, West Kent Works, Burham, near Rochester, in the county of Kent, England, have invented an Improved Spring-Motor, of which the following is a specification.

This invention relates to an improved spring motor employing a spring or springs or equivalent means for supplying the driving effort. When a spring under compression gives out its accumulated power or force, it acts with a varying intensity from the time that it commences to expand, and the object of the present invention is to provide an improved mechanism of simple and efficient nature for enabling any desired and predetermined constant or uniform motion or output of energy to be secured from a spring motor.

According to this invention, the spring or its equivalent operates to bring about relative motion between a cam path or edge and a transmission device such as an anti-friction roller, and, seeing that the cam path or edge can be readily designed to produce the required or predetermined effect, it follows that a mechanism comprising such cam device may be adapted for enabling a uniform effort to be obtained from a spring. In a preferred construction, which is advantageously used for the production of a uniform turning effort during the expansion or contraction of a metal spring, an anti-friction roller is urged in a straight line by the spring and engages a suitably curved path or cam edge on a rotatable disk which is geared with the mechanism to be driven. As the roller moves along under the effort of the spring, the cam path or edge is engaged and operated by the roller and the disk is caused to rotate, the effective radius or lever arm engaged by the roller being gradually increased as operation of the motor proceeds and the effort of the spring weakens, and the effort produced by the spring thereby being kept about uniform during the whole range of operation of such spring. Instead of the cam path or edge being formed on a rotatably mounted disk or plate, the same may be formed on a sliding plate adapted for having a rectilinear motion which may be transformed into rotary motion by any suitable mechanism.

In order to enable the invention to be readily understood, reference is made to the accompanying drawings in which:—

Figure 1:
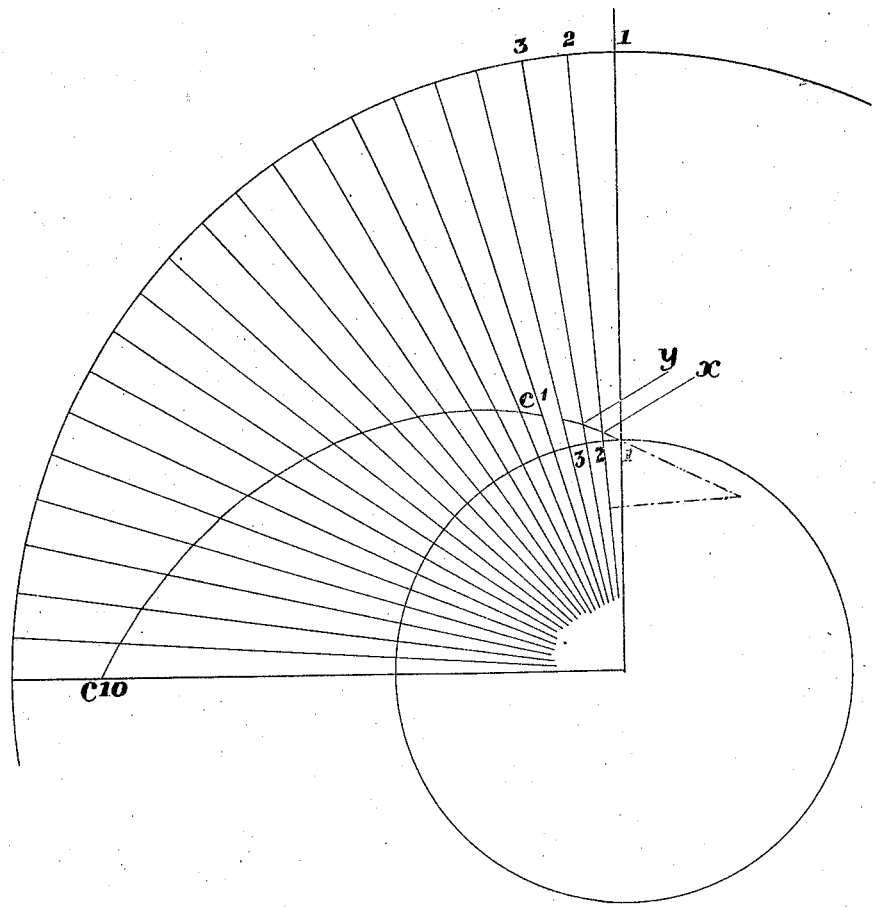
Figure 1 is a diagram illustrating how the curve of the cam path or edge is produced.
Figure 1:
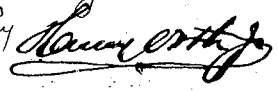
Figure 2:
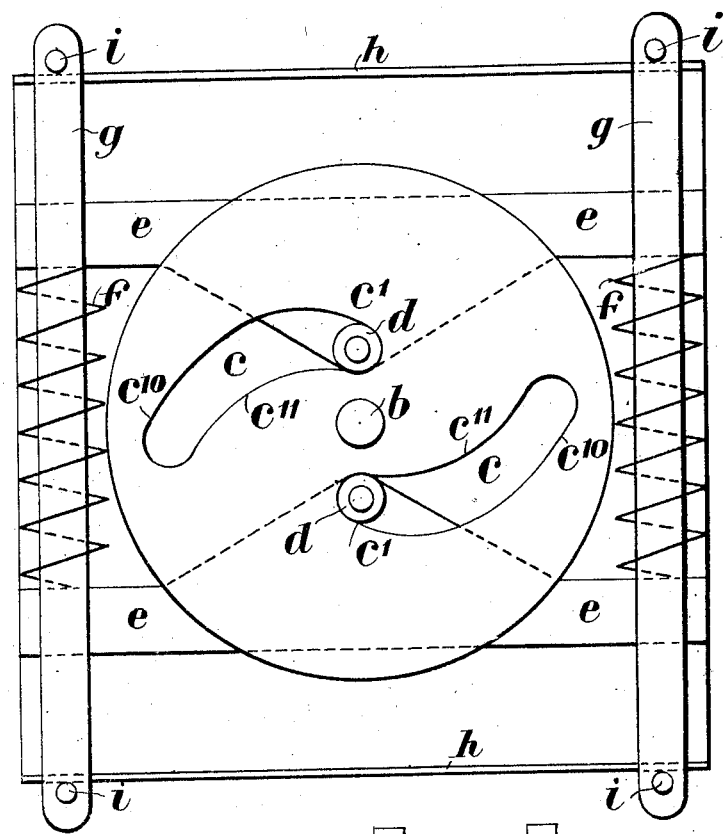
Fig. 2 is an elevation illustrating a construction comprising a rotatable disk or plate.

In designing a cam path or edge for a rotatable disk or plate, such as is seen in Fig. 2, two concentric circles are described, as seen in Fig. 1, and a fairly large number of radial lines is drawn intersecting the circles. A set square indicated in chain lines in Fig. 1, having angles of 90°, 60° and 30° is then placed with its perpendicular side alined with radius 2—2 and its hypotenuse intersecting the radius 1—1 at the point of intersection of the inner circle with the radius 1—1. A line 1—$x$ is then drawn along the hypotenuse. The set square is then placed with its perpendicular against the radius 3—3 and with its hypotenuse intersecting the radius 2—2 at the point $x$ and a line $x\,y$ is drawn along the hypotenuse. This process is continued for any desired length of cam edge and angle of revolution, as will be readily understood. When this has been done a curve is drawn in following the points of intersection $x\,y$, etc., a part of the curve being shown by the thick curved line in Fig. 1, and this curve is suitable for a cam edge or path for operating as hereinafter described. With this description of curve, which may be termed a 30° constant angle curve, it may be discovered, either by experiment or by calculation, that at the innermost point at which the roller makes contact a spring pressure of, say, 173.3 pounds is required to produce a turning moment of 100 inch pounds, whereas at the outermost point, which may be at six times the effective radius, a spring pressure of, say, 28.8 pounds is required to produce the same turning moment. It would be an easy matter to produce a spring capable of giving these limit pressures or efforts and, consequently, with the curve designed as above described, the pressures at all intermediate points would be productive of about the same turning moment so that there would be a uniform output or effort produced by the spring throughout the whole range of its operation. To secure an accurately uniform turning moment, it is necessary to modify the curve in the center from the constant angle and this is accomplished by re-calculating a number of points in order to vary the angle slightly and at the same time to lengthen or shorten slightly the radial distances as may be required. If the positions at the beginning and end of the path are calculated for, then with a constant angle curve produced as above described the motion will be approximately uniform without further modification and quite satisfactory for most purposes.

Referring to Fig. 2, it will be seen that a disk $a$ is rotatably mounted on a spindle $b$ which is suitably centered in a framing $h$. In the disk $a$ are cut two slots $c$ each having a side or edge $c'$ $c^{10}$ produced according to the pattern of the curve $c'$ $c^{10}$ in Fig. 1. The edge $c^{11}$ of each slot need not be of this pattern but need only be spaced from the other edge sufficiently to permit a roller $d$ to roll in its slot with clearance. The two rollers are carried by respective cross heads $e$ which, during the operation of the motor, are pressed apart by springs $f$, being guided upon parallel guides $g$ secured to the frame at the points $i$. The springs $f$ are made of a strength and proportion to suit the work to be done. The disk $a$, or the spindle $b$ may be geared to any mechanism by means of wheels or otherwise, and the said mechanism may comprise a brake or governor, or both, although it should be pointed out that a constant speed will be attained where a constant load is applied, within very narrow limits, even in the absence of a governing device.

In operation, the disk $a$ is turned reversely, or the cross heads $e$ are caused to approach one another by any suitable means, until the parts are brought to the position seen in Fig. 2, whereupon the springs $f$ are compressed and the rollers $d$ are brought to the starting points of contact with the cam edges of the slots $c$. Upon a brake or catch being released, supposing the same to have been applied, the springs will press the cross heads apart and as a consequence, the rollers press against the curved edges $c'$ $c^{10}$ of the slots $c$ and the disk $a$ will begin to rotate and drive the mechanism with which it is geared. As the operation proceeds, the slots $c$ move along the rollers $d$ and the latter operate the disk $a$ at a greater effective radius, the weakening of the springs as they expand being compensated in this manner. The provision of two cam paths or edges on one disk, as shown in Fig. 2, enables a couple to be produced about the axis of the spindle, and as an alternative, and as will, for example, be hereinafter described with reference to Figs. 4 and 5, two disks may be mounted on the spindle and each may be formed with two slots, the slots in one disk being right handed and the slots in the other left handed in order to drive the disks in opposite directions. The disks are suitably geared with the mechanism to be driven and in this manner the reaction on the spindle of one of the disks will be balanced by the reaction of the other.

Figure 3:
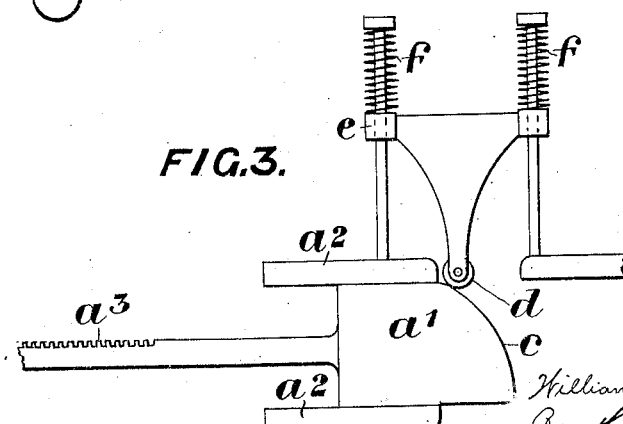
Fig. 3 is a diagrammatic view of a construction comprising a plate having rectilinear motion.

If desired, and as illustrated in Fig. 3, a sliding member $a'$ may be substituted for the revoluble disk $a$, the said member moving in suitable guides $a^2$ and being fitted with a rack $a^3$ or other means for transmitting motion. In this case the roller $d$ on the cross head $e$ is pressed by the springs $f$ into operative contact with a cam edge $c$ of suitable design. In this construction, of course, there is no question of variable effective radius, but the compensation for the weakening of the springs as they expand is effected by gradual increase in the declivity of the curve $c$, as will be readily understood.

With a mechanism constructed and operating as described with reference to Fig. 2, it is possible to drive a gramophone table, for example, and to impart thereto two or three thousand turns with an expansion of the springs of about 4¾ inches, the driving effort and the speed being practically uniform throughout the whole range.

Figure 4:
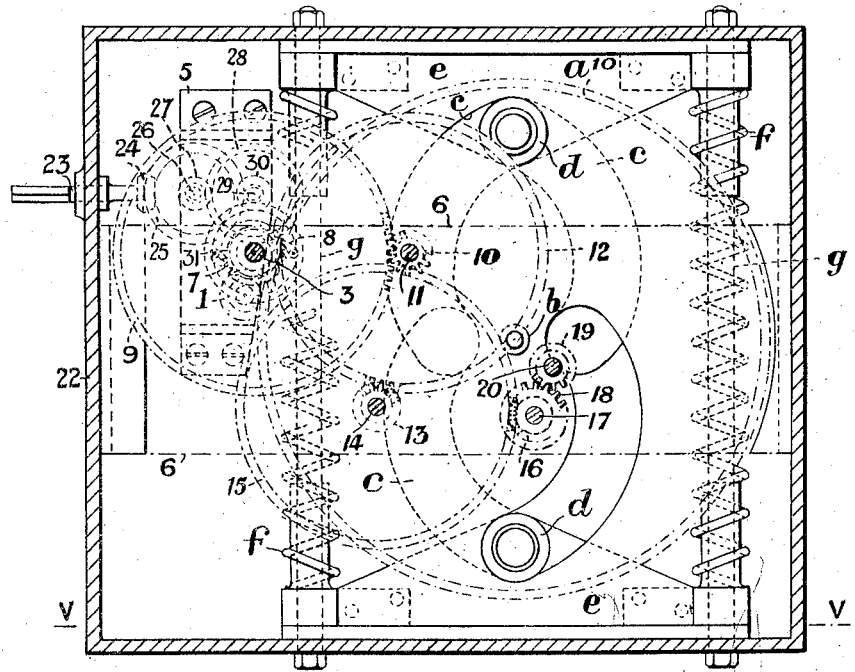
Fig. 4 is a plan section on the line IV—IV of Fig. 5 of one construction of spring motor with multiplying gearing in accordance with these improvements.
Figure 5:
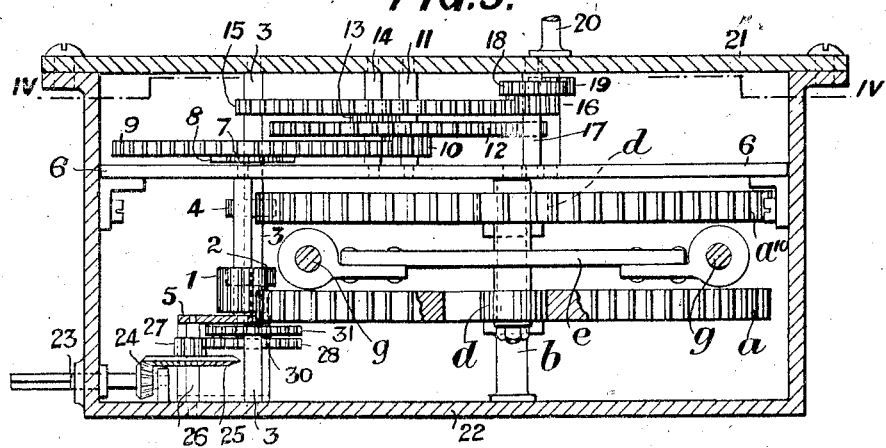
Fig. 5 is a sectional elevation, the section being on the line V—V of Fig. 4.

Referring to Figs. 4 and 5, it will be seen that the motor there shown embodies the features more or less diagrammatically illustrated by Fig. 2, similar reference letters being placed against similar or corresponding parts in all these figures. The two cross heads $e$ operate respective disks $a$ $a^{10}$, through the medium of slots $c$ and rollers $d$, instead of operating on one and the same disk as in Fig. 2. Each crosshead carries two rollers $d$ one above the crosshead and one below as will be understood from Fig. 5, wherein the disk $a$ is partly broken away to show clearly the lower roller $d$. The disks have toothed peripheries and the teeth of the disk $a$ mesh with an intermediate pinion 1 which meshes with a pinion 2 fixed on a spindle 3, whereas the disk $a^{10}$, which turns in the opposite direction to that in which the disk $a$ turns, meshes with a pinion 4 fixed on the spindle 3. The spindle of the intermediate pinion 1 may be supported between a bracket 5 and a frame plate 6 hereinafter described. The spindle 3 may be fitted with a ratchet wheel 7 adapted to be engaged by pawls 8 on a large pinion 9 which is loosely mounted on the spindle 3. This ratchet and pawl engagement, or any other suitable clutching or overrunning means permits the disks $a$ $a^{10}$ to be revolved reversely in winding up, without affecting the train of gears now to be described. The pinion 9 meshes with a small pinion 10 fixed on a spindle 11 and a large pinion 12 fixed on the spindle 11 meshes with a small pinion 13 fixed on a spindle 14. A large pinion 15 fixed on the spindle 14 meshes with a small pinion 16 fixed on a spindle 17 and a pinion 18 fixed on the spindle 17 meshes with a pinion 19 fixed on a spindle 20 extending through the cover 21 of the casing 22 of the motor. The spindle 20 can be used for driving any desired machine or apparatus as for example a gramophone table. The various spindles may be supported in the bottom of the casing 22, in the frame plate or the like 6 fixed on the walls of the casing and, if desired, in the cover 21 of the casing. The plate 6 is shown in chain lines in Fig. 4 merely for the sake of clearness. The disks $a$, $a^{10}$, may be reversely turned for winding up by means of a winding spindle 23, a bevel wheel 24 thereon meshing with a bevel wheel 25 on a spindle 26 on which is fixed a pinion 27 meshing with a pinion 28 on a short spindle 29, seen only in Fig. 4. A small pinion 30 fixed on the spindle 29 meshes with a larger pinion 31 on the spindle 3. The spindles 26 and 29 are supported between the bracket 5 and the bottom of the casing 22. It will be apparent from Figs. 4 and 5 that the partial revolutions of the disks $a$ $a^{10}$ are effective, through the medium of the multiplying gear, for producing many hundreds of revolutions of the driven spindle 20 of the motor.

Figure 6:
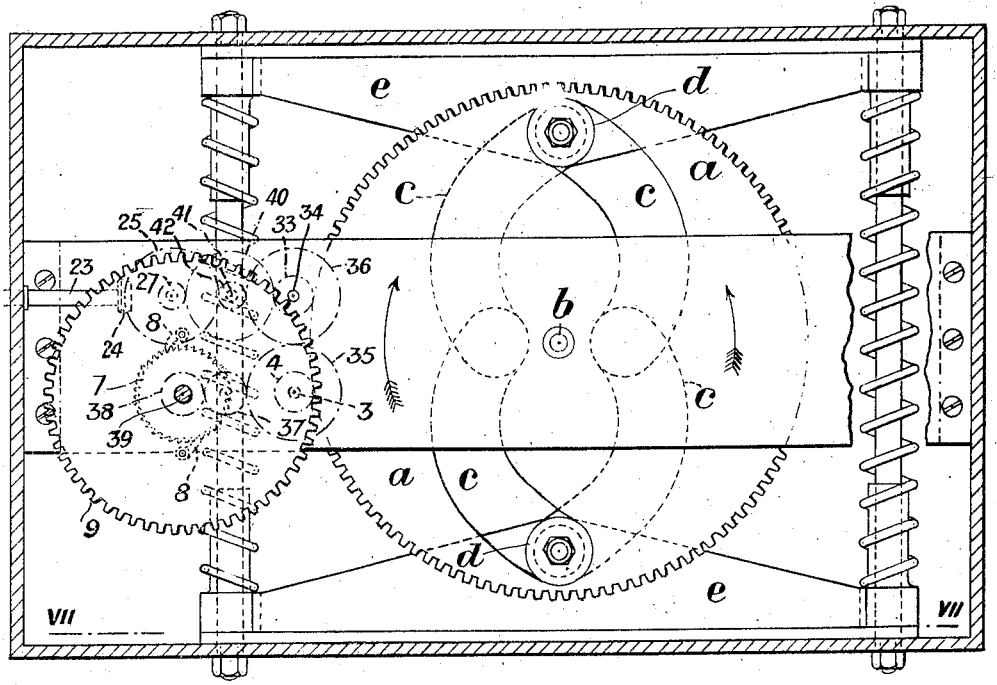
Fig. 6 is a plan section on the line VI—VI of Fig. 7 of a modified construction and Fig. 7 is a sectional elevation, the section being on the line VII—VII of Fig. 6.
Figure 7:
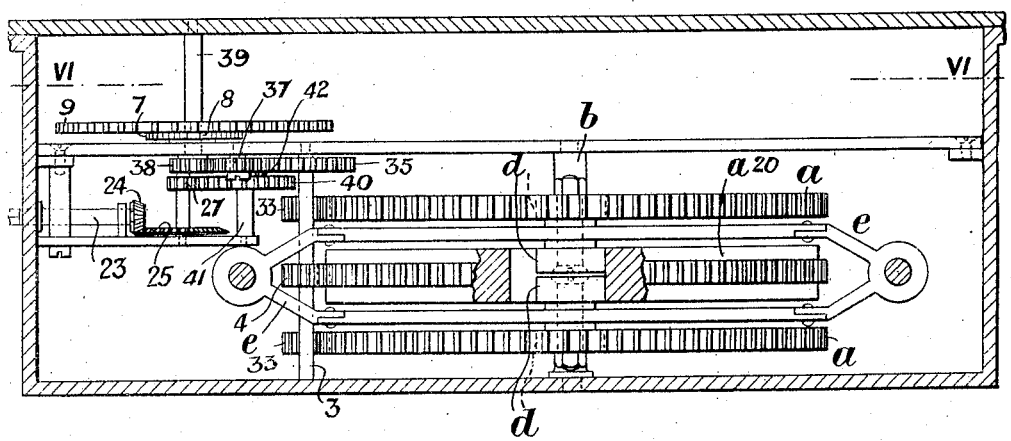

In the modification illustrated in Figs. 6 and 7, there are two outer disks $a$ and a central disk $a^{20}$, driven through the medium of slots $c$ in the disks and rollers $d$ on the crossheads $e$. Each cross head $e$ consists of a pair of cross head members, as seen in Fig. 7, the disk $a^{20}$ being disposed between the members of each pair, and there is a roller $d$ arranged above and another roller arranged below each crosshead member, so that there are two rollers on each crosshead engaging a slot $c$ in the disk $a^{20}$ as shown clearly at the central broken away portion of the disk $a^{20}$ in Fig. 7. Each cross head member, therefore, is adapted to operate an outer disk $a$ and the middle disk $a^{20}$, the disks $a$ being driven in the direction of the large arrow Fig. 6 and the middle disk $a^{20}$ being driven reversely in the direction indicated by the small arrow. The teeth on the periphery of the disk $a^{20}$ drive a pinion 4 on a spindle 3 whereas the teeth on the peripheries of the disks $a$ drive pinions 33 on a spindle 34, seen only in Fig. 6. Similar pinions 35 and 36 on the spindles 3 and 34 respectively mesh with one another and the driving effort of all three disks is transmitted by pinion 35 through pinions 37 and 38 to a spindle 39 which drives a pinion 9 through an over-running pawl device 7, 8 as in Figs. 4 and 5. The pinion 9 drives a train of gearing which is not shown as it may be exactly similar to that shown in Figs. 4 and 5. The winding spindle 23, is fitted, as before, with a bevel pinion 24 driving a bevel pinion 25 which turns a pinion 27. The last-named meshes with a pinion 40 fixed on a spindle 41 to which also is fixed a pinion 42 meshing with the pinion 36. It will be understood from Fig. 7 that, owing to the disposition and reverse turning of the outer disks $a$ as compared with the middle disk $a^{20}$, any couple tending to turn the spindle $b$ of the disks about an axis at right angles to its longitudinal axis, is eliminated.

I claim:—

1. A spring motor comprising in combination a movable cam device provided with a smooth cam edge of predetermined curvature, an abutment engaging said cam edge, elastic force means, a slide operated by said means to produce relative motion between said cam edge and said abutment, and a gear operatively engaged for transmitting the drive produced by the engagement of and relative motion between said cam edge and said abutment.

2. A spring motor comprising in combination elastic force means, a slide operated by said means, a cam device provided with a smooth cam edge of predetermined curvature, an abutment on said slide engaging said cam, and multiplying gearing in operative engagement with said cam device.

3. A spring motor comprising in combination elastic force means, a slide operated by said means, a guide for said slide, an antifriction abutment carried by said slide, a revoluble cam device provided with a cam edge of predetermined curvature in operative engagement with said abutment, and transmission mechanism geared with said cam device.

4. A spring motor comprising in combination elastic force means, a slide operated by said means, a guide for said slide, an antifriction abutment carried by said slide, a revoluble disk formed with a curved cam slot for receiving said abutment, said slot having a cam face of predetermined curvature in operative engagement with said abutment, and transmission gearing in driving connection with said disk.

5. A spring motor comprising in combination two sliding devices, guides therefor, expansible means between said sliding devices, antifriction abutments on said sliding devices, revoluble means having curved cam slots adapted for receiving respective abutments, said slots having cam edges of predetermined curvature in operative engagement with respective abutments, and transmission mechanism geared with said revoluble means.

6. A spring motor comprising in combination two sliding devices, guides therefor, expansible means between said sliding devices, anti-friction abutments on said sliding devices, a plurality of disks revolubly mounted and formed with cam slots of which some are right handed and some left handed said slots being engaged by respective abutments, a shaft geared directly with certain of said disks and through intermediate gear with other of said disks, and a multiplying transmission mechanism geared with said shaft substantially as set forth.

7. A spring motor comprising in combination two sliding cross heads, parallel guides therefor, expansible means adapted for driving said cross heads apart, anti-friction rollers revolubly mounted on said cross heads, revoluble disks formed with cam-shaped slots for receiving said rollers, and transmission mechanism geared with said revoluble disks substantially as set forth.

8. A spring motor comprising in combination elastic force means, a slide operated by said means, a guide for said slide, an anti-friction abutment carried by said slide, a revoluble disk formed with a cam-slot for receiving said abutment, said slot having a cam edge of predetermined curvature in engagement with said abutment, transmission mechanism geared with said disk, a one-way clutching device included in said transmission, and a winding mechanism geared with said disk substantially as set forth.

WILLIAM JOHN DICKINSON.